(12) United States Patent
Nakai et al.

(10) Patent No.: US 6,590,708 B2
(45) Date of Patent: *Jul. 8, 2003

(54) LENS SYSTEM HAVING DIFFRACTING SURFACE AND REFRACTING SURFACE AND OPTICAL APPARATUS USING THE LENS SYSTEM

(75) Inventors: Takehiko Nakai, Kawasaki (JP); Michitaka Setani, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/954,874

(22) Filed: Oct. 21, 1997

(65) Prior Publication Data

US 2002/0051293 A1 May 2, 2002

(30) Foreign Application Priority Data

Oct. 29, 1996 (JP) .............................................. 8-286646
Feb. 27, 1997 (JP) .............................................. 9-043509

(51) Int. Cl.$^7$ ................................................ F21V 9/04
(52) U.S. Cl. ...................... 359/558; 359/570; 359/571; 359/569
(58) Field of Search ................................ 359/569, 565, 359/570, 558

(56) References Cited

U.S. PATENT DOCUMENTS

| | | | | |
|---|---|---|---|---|
| 5,260,828 A | | 11/1993 | Londono et al. ............. | 359/565 |
| 5,299,062 A | * | 3/1994 | Ogata .......................... | 359/565 |
| 5,504,628 A | | 4/1996 | Borchard ..................... | 359/796 |
| 5,543,966 A | | 8/1996 | Meyers ........................ | 359/565 |
| 5,581,405 A | * | 12/1996 | Meyers et al. ............... | 359/569 |
| 5,691,847 A | | 11/1997 | Chen ........................... | 359/565 |
| 5,745,289 A | * | 4/1998 | Hamblen ..................... | 359/565 |
| 5,790,321 A | * | 8/1998 | Goto ............................ | 359/571 |
| 6,215,591 B1 | * | 4/2001 | Ueda et al. .................. | 359/566 |

FOREIGN PATENT DOCUMENTS

| | | |
|---|---|---|
| EP | 0517409 | 12/1992 |
| EP | 0758753 | 2/1997 |

OTHER PUBLICATIONS

Neufeldt, Victoria. Webster's New World Dictionary Third College Edition. Simon & Schuster, Inc., New York, New York, pp. 11 and 250, Dec. 1988.*

* cited by examiner

Primary Examiner—Audrey Chang
Assistant Examiner—Fayez Assaf
(74) Attorney, Agent, or Firm—Fitzpatrick, Cella, Harper & Scinto

(57) ABSTRACT

In a lens system having one or a plurality of diffracting surfaces and one or a plurality of refracting surfaces, a power of each surface and a distance between the surfaces are set such that an optical characteristic of the lens system, such as a focal length (focal point) and/or a spherical aberration, remains substantially unvarying relative to temperature variations within a predetermined range and that an achromatic effect is substantially attained for the focal length (focal point) and/or the spherical aberration within a predetermined region of wavelength.

27 Claims, 3 Drawing Sheets

LENS SYSTEM HAVING DIFFRACTING SURFACE AND REFRACTING SURFACE AND OPTICAL APPARATUS USING THE LENS SYSTEM

BACKGROUND OF THE INVENTION

1. Field of the Invention

The present invention relates to a lens system having a diffracting surface and a refracting surface, and more particularly to a lens system advantageously adapted for the image forming optical system of an optical apparatus such as an interchangeable lens, a camera, a copying apparatus, a semiconductor-device-manufacturing exposure device, a microscope, a binocular, a telescope, an optical recording/reproducing apparatus, a projector, or the like.

2. Description of Related Art

In a lens system in which a material having a high thermal expansion coefficient, such as a plastic material, is used for a lens, variations in temperature cause a change in refractive index of the material and also cause the material to expand or contract to change the shape of the lens. The optical characteristics of the lens system would be affected by the temperature variations if such changes are left uncorrected. Therefore, it is necessary to have some correcting means. To meet this requirement, it is usual to prestore in a memory or the like the amounts of changes in optical characteristics (such as focus, etc.) anticipated to be caused by temperature variations, have a temperature sensor arranged in the vicinity of the lens, and make necessary correction by reading an applicable amount of change of the optical characteristics due to the temperature variations from the memory in accordance with the output of the temperature sensor (corresponding to the amount of change of temperature or to the temperature). However, this correcting method necessitates the use of additional means such as the temperature sensor and the memory, thereby causing an increase in cost of the lens system. To solve that problem, a method of arranging the lens system itself to be capable of correcting changes of optical characteristics due to temperature variations without using such correcting means has been developed, for example, as disclosed in U.S. Pat. No. 5,260,828. According to U.S. Pat. No. 5,260,828, a diffracting optical system (diffracting surface) such as a kinoform or the like and a refracting optical system (refracting surface) such as an ordinary lens are combined with each other in such a way as to have temperature characteristics opposite to each other.

In the lens system which is formed by combining the diffracting optical system and the refracting optical system, the color dispersion characteristic of the refracting optical system is inverse to that of the diffracting optical system. Therefore, it is known that an achromatic effect (achromatism) can be attained by arranging the power of the diffracting optical system (1/"focal length") to be of the same sign as that of the power of the refracting optical system (1/"focal length").

However, according to the specification of the above-mentioned U.S. Pat. No. 5,260,828, a relation obtained between the diffracting optical system and the refracting optical system in correcting variations of optical characteristics caused by variations in temperature is as follows. 1) The power of the diffracting optical system is at least 20% in absolute values. 2) In a plastic-used lens system, the power of the diffracting optical system is either larger than the power of the refracting optical system or of opposite sign.

Further, according to the specification of the above-mentioned U.S. Pat. No. 5,260,828, the relation between the diffracting optical system and the refracting optical system to be arranged for achromatism, i.e., in attaining an achromatic effect, is as follows. The power of the diffracting optical system is less than 15% in absolute values, and the power of the diffracting optical system is smaller than the power of the refracting optical system and of the same sign.

As mentioned above, the lens system formed by combining the diffracting optical system and the refracting optical system, as disclosed in U.S. Pat. No. 5,260,828, is arranged to do nothing for achromatism while correcting the variations of optical characteristics caused by temperature variations. In that lens system, therefore, a chromatic aberration inevitably takes place, thereby lowering the performance of the lens system.

BRIEF SUMMARY OF THE INVENTION

It is an object of the invention to provide a lens system having a high rate of performance and an optical apparatus using the lens system.

In accordance with an aspect of the invention, there is provided a lens system having one or a plurality of diffracting surfaces and one or a plurality of refracting surfaces, in which a power of each surface and a distance between the surfaces are set such that an optical characteristic of the lens system, such as a focal length (focal point) and/or a spherical aberration, remains substantially unvarying relative to temperature variations within a predetermined range and that an achromatic effect is substantially attained for the optical characteristic (the focal length (focal point) and/or the spherical aberration) within a predetermined region of wavelength.

Further, in accordance with another aspect of the invention, there is provided a lens system having one or a plurality of diffracting surfaces and one or a plurality of refracting surfaces, in which a power of each surface and a distance between the surfaces are set such that an optical characteristic of the lens system, such as a focal length (focal point) and/or an amount of spherical aberration, remains the same at two different temperatures and that the optical characteristic (the focal length (focal point) and/or the amount of spherical aberration) remains the same at two different wavelengths.

Further, in accordance with a further aspect of the invention, there is provided an optical apparatus using one of the above-stated lens systems as an image forming optical system, in which the optical apparatus is an interchangeable lens, a camera, a copying apparatus, a semiconductor-device-manufacturing exposure device, a microscope, a binocular, a telescope, an optical recording/reproducing apparatus, a projector or the like.

The above and other objects and features of the invention will become apparent from the following detailed description of embodiments thereof taken in connection with the accompanying drawings.

DETAILED DESCRIPTION OF THE INVENTION

Hereinafter, preferred embodiments of the invention will be described in detail with reference to the drawings.

Figure 1:
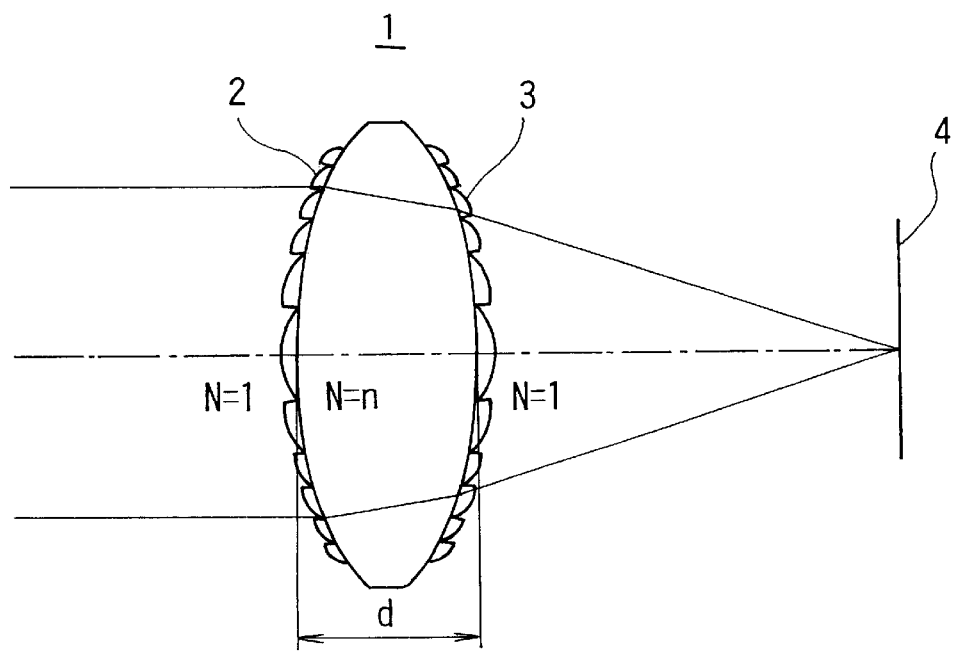
FIG. 1 shows a lens system arranged according to the invention as an embodiment thereof.

FIG. 1 shows a first embodiment of the invention. In the first embodiment shown in FIG. 1, a lens system is composed of a single lens, for the sake of simplification of illustration. However, the lens system of course may be changed to include two or more lenses, instead of just one. In FIG. 1, reference numeral 1 denotes a hybrid lens system composed of a diffracting optical system and a refracting optical system. A light flux incident on the lens system 1 is bent to a certain degree of angle at a first surface 2 having a diffracting surface, by a diffracting action of the diffracting surface and also by a refracting action of the curvature of a convex surface of the base of the lens system 1. Then, after passing through the material of the base of the lens system 1, the light flux is bent at a second surface 3 having a diffracting surface, by a diffracting action of the diffracting surface and a refracting action of the curvature of another convex surface of the base of the lens system 1. The light flux is thus caused to converge on a focal plane 4. In FIG. 1, the diffracting surface is illustrated exaggeratedly in a deformed shape in an optical axis direction. In actuality, letting a wavelength as a datum be denoted by $\lambda_0$ and a refractive index obtained at the wavelength $\lambda_0$ of the material which forms the diffracting surface (diffraction grating) be denoted by $n_0$, the depth h in the optical axis direction of the diffraction grating can be expressed as follows:

$$h = \frac{m\lambda_0}{(n_0 - 1)} \quad (m \text{ being a positive number}).$$

If the value m is assumed to be 1, the datum wavelength $\lambda_0$ to be 540 nm and the refractive index $n_0$ to be 1.49409, the depth h is 1.092 μm. Incidentally, a diffraction grating which forms the diffracting surface of each of the first surface 2 and the second surface 3 of the lens system 1 has a finite power (1/"focal length").

Referring to FIG. 1, the power of the diffracting surface of the first surface 2 is assumed to be $\phi_a$ and the curvature of the base at the first surface 2 is assumed to be $r_1$. Then, assuming that the light entrance side of the first surface 2 is air, a refractive index N of which is 1, and the base is a material whose refractive index N is n, a power $\phi_1$ of the refracting optical system of the first surface 2 can be expressed as: $\phi_1=(n-1)/r_1$. Since, in the first surface 2, the diffracting surface and the refracting surface exist on a common surface with a distance between them at "0" in this instance, a composite power $\phi_{1a}$ of the first surface 2 can be expressed as $\phi_{1a}=\phi_a+\phi_1$. In the similar way, the power of the diffracting surface of the second surface 3 is assumed to be $\phi_b$ and the curvature of the base at the second surface 3 is assumed to be $r_2$. Then, assuming that the light exits into air of the refractive index N=1 from the material of the refractive index N=n, a power $\phi_2$ of the refracting optical system of the second surface 3 can be expressed as $\phi_2=(1-n)/r_2$. Then, since, in the second surface 3, the diffracting surface and the refracting surface exist on a common surface with a distance between them at "0", a composite power $\phi_{2b}$ of the second surface 3 can be expressed as $\phi_{2b}=\phi_b+\phi_2$. A distance between the first surface 2 and the second surface 3 is assumed to be "d" and to be filled with the material of the refractive index "n" as mentioned above.

Here, the concrete construction of the lens system 1 will be described by way of example. The base of the lens system 1 is made of a PMMA (polymethyl methacrylate), which is a kind of plastic material, to perform an achromatic action with respect to wavelengths 540 nm and 610 nm and to have no variation take place in the power of the entire lens system as an optical characteristic within a range of temperature variation amount of 20 degrees.

The characteristics of the PMMA used for the base of the lens system 1 are first described as follows. The refractive indices $n_0$ and $n_1$ of the PMMA obtained respectively at wavelengths 540 nm and 610 nm are 1.49409 and 1.49078 ($n_0$=1.49409 and $n_1$=1.49078). Further, the coefficient of linear expansion α of the PMMA is α=6.74×10$^{-5}$, and the refractive index variation $$\frac{dn}{dt}$$

of the PMMA due to temperature variations is expressed below:

$$\frac{dn}{dt} = -11.5 \times 10^{-5}.$$

Here, the power $\phi_T$ of the entire lens system 1 can be expressed as follows:

$$\phi_T = \phi_{1a} + \phi_{2b} - \frac{d}{n}\phi_{1a} \cdot \phi_{2b} \qquad (1)$$

$$= (\phi_a + \phi_1) + (\phi_b + \phi_2) - \frac{d}{n}(\phi_a + \phi_1) \cdot (\phi_b + \phi_2).$$

Assuming that the powers of elements obtained at the wavelength value $\lambda_0$=540 nm are expressed by the variables mentioned above, they can be normalized to have the power $\phi_T$ of the entire lens system at "1" expressed by the following formula:

$$\phi_T = (\phi_a + \phi_b) + (\phi_1 + \phi_2) - \frac{d}{1.49409}(\phi_a\phi_b + \phi_1\phi_2 + \phi_a\phi_2 + \phi_b\phi_1) \qquad (2)$$

$$= 1.$$

Next, assuming that the power of the entire lens system 1 at the wavelength $\lambda_1$=610 nm is expressed as $\phi_{T'}$, the power $\phi_{T'}$ of the entire lens system 1 is obtained as follows. The diffraction grating mentioned above has a feature which is represented by the following relation:

$$\frac{\lambda}{\phi} = \text{constant},$$

wherein λ represents wavelength, and φ represents power.

Therefore, the power $\phi_a'$ of the diffracting surface of the first surface 2 obtained at the wavelength $\lambda_1$ can be expressed as follows:

$$\phi'_a = \frac{\lambda_1}{\lambda_0}\phi_a.$$

The power $\phi_b'$ of the diffracting surface of the second surface 3 likewise can be expressed as follows:

$$\phi'_b = \frac{\lambda_1}{\lambda_0}\phi_b.$$

The power of the refracting optical system, on the other hand, becomes as follows:

The power $\phi_1'$ of the refracting optical system obtained on the first surface 2 is expressed as follows:

$$\phi'_1 = \frac{n_1 - 1}{r_1} = \frac{n_1 - 1}{n_0 - 1}\phi_1.$$

On the second surface 3, the power $\phi_2'$ of the refracting optical system becomes as expressed below:

$$\phi'_2 = \frac{1 - n_1}{r_2} = \frac{n_1 - 1}{n_0 - 1}\phi_2.$$

Therefore, the power $\phi_T'$ of the entire lens system 1 can be expressed as follows:

$$\phi'_T = (\phi'_a + \phi'_b) + (\phi'_1 + \phi'_2) - \frac{d}{n_1}(\phi'_a\phi'_b + \phi'_1\phi'_2 + \phi'_a\phi'_2 + \phi'_b\phi'_1) = \quad (3)$$

$$\frac{\lambda_1}{\lambda_0}(\phi_a + \phi_b) + \frac{n_1 - 1}{n_0 - 1}(\phi_1 + \phi_2) -$$

$$\frac{d}{n_1}\left\{\frac{\lambda_1^2}{\lambda_0^2}\phi_a\phi_b + \frac{(n_1 - 1)^2}{(n_0 - 1)^2}\phi_1\phi_2 + \frac{\lambda_1}{\lambda_0} \cdot \frac{n_1 - 1}{n_0 - 1}(\phi_a\phi_2 + \phi_b\phi_1)\right\}.$$

In order to attain the achromatic effect for the wavelengths 540 nm and 610 nm, the respective powers $\phi_T$ and $\phi_T'$ of the entire lens system 1 must be made equal to each other. Therefore, from the relation of $\phi_T = \phi_T'$, a first condition formula can be derived as expressed below:

$$\phi_T' - \phi_T = 0 \quad (4).$$

The power $\phi_T''$ of the entire lens system 1 in the case of occurrence of temperature variations is next obtained. When a temperature change $\Delta t$ takes place, the linear expansion of the lens system 1 causes the curvature r to change to $r'' = (1 + \alpha\Delta t)r$. Meanwhile, the diffracting surface has a phase function $\phi(r_a)$ which is expressed as follows:

$$\phi(r_a) = \frac{\Pi r_a^2}{\lambda_0}\phi_a - 2n\Pi.$$

Therefore, powers $\phi_a''$ and $\phi_b''$ of the diffracting surfaces obtained respectively on the first surface 2 and the second surface 3 when the temperature change $\Delta t$ takes place become respectively as expressed below:

$$\phi''_a = \frac{1}{(1+\alpha\Delta t)^2}\phi_a, \quad \phi''_b = \frac{1}{(1+\alpha\Delta t)^2}\phi_b.$$

Further, powers $\phi_1''$ and $\phi_2''$ of the refracting optical system become respectively as expressed below:

$$\phi''_1 = \frac{n_2 - 1}{r''_1} = \frac{n_2 - 1}{(n_0 - 1)(1 + \alpha\Delta t)}\phi_1, \quad \phi''_2 = \frac{1 - n_2}{r''_2} = \frac{n_2 - 1}{(n_0 - 1)(1 + \alpha\Delta t)}\phi_2.$$

wherein "$n_2$" represents a refractive index obtained after the change of temperature and is expressed as follows:

$$n_2 = n_0 + \frac{dn}{dt}\Delta t$$

Further, a change in temperature also causes a distance "d" between the first surface 2 and the second surface 3 to change to $d'' = (1 + \alpha\Delta t)d$. As a result, the power $\phi_T''$ of the entire lens system 1 obtained after the change of temperature becomes as expressed below:

$$\phi''_T = \phi''_a + \phi''_b + \phi''_1 + \phi''_2 - \frac{d''}{n_2}(\phi''_a\phi''_b + \phi''_1\phi''_2 + \phi''_a\phi''_2 + \phi''_b\phi''_1) = \quad (5)$$

$$\frac{1}{(1+\alpha\Delta t)^2}(\phi_a + \phi_b) + \frac{\left(n_0 + \frac{dn}{dt}\Delta t - 1\right)}{(n_0 - 1)(1 + \alpha\Delta t)}(\phi_1 + \phi_2) -$$

$$\frac{d(1+\alpha\Delta t)}{n_0 + \frac{dn}{dt}\Delta t}\left\{\frac{1}{(1+\alpha\Delta t)^4}\phi_a\phi_b + \frac{\left(n_0 + \frac{dn}{dt}\Delta t - 1\right)^2}{(n_0 - 1)^2(1 + \alpha\Delta t)^2}\phi_1\phi_2 + \right.$$

$$\left.\frac{\left(n_0 + \frac{dn}{dt}\Delta t - 1\right)}{(n_0 - 1)(1 + \alpha\Delta t)^3}(\phi_a\phi_2 + \phi_b\phi_1)\right\}.$$

From the above formula, a second condition formula for eliminating the power fluctuations of the lens system due to temperature variations can be derived as expressed below:

$$\phi_T'' - \phi_T = 0 \quad (6).$$

Figure 2:
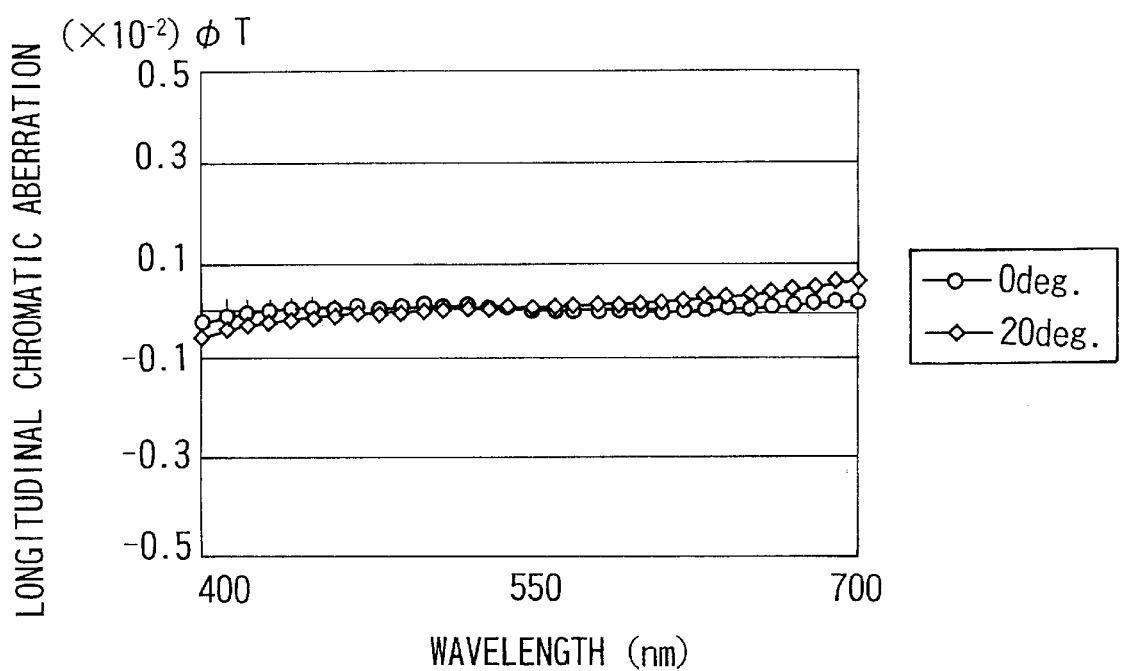
FIG. 2 shows by way of example how the power of the lens system shown in FIG. 1 varies in relation to variations of wavelength.
Figure 3:
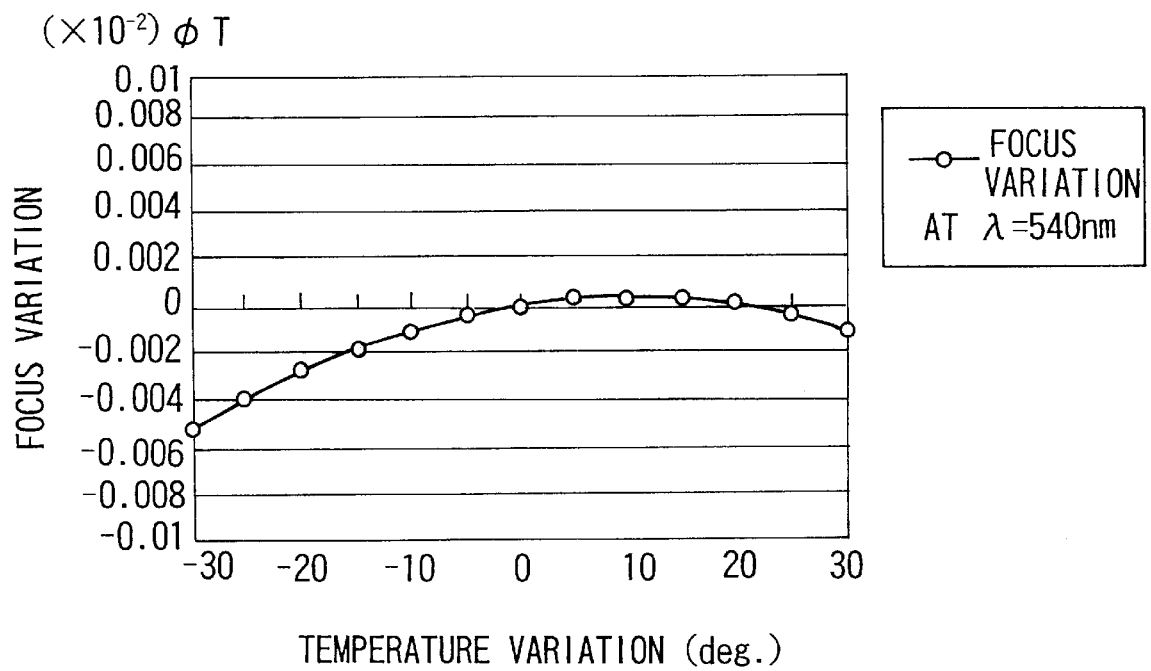
FIG. 3 shows by way of example how the power of the lens system shown in FIG. 1 varies in relation to variations of temperature.

The lens system 1 according to the invention has the above-stated variables $\phi_a$, $\phi_b$, $\phi_1$, $\phi_2$ and "d" arranged to be at such values that satisfy the formulas (2), (4) and (6). The arrangement enables the embodiment to attain an achromatic effect at the wavelengths 540 nm and 610 nm with the power of the entire lens system 1 set at "1" so that the lens system 1 can be arranged to have no variation in the entire system power against variations in temperature. Since there are three condition formulas for five variables, a solution cannot be uniquely obtained and thus takes various values. One example of the solution indicates existence of one arrangement whereby no variation of optical characteristics (power) takes place for variations in temperature. In the case of this example, the five variables $\phi_a$, $\phi_b$, $\phi_1$, $\phi_2$ and "d" are set as follows: $\phi_a = -0.0194024$, $\phi_b = 0.4925936$, $\phi_1 = 1.1402412$, $\phi_2 = 1.3370397$ and $d = 1.4210498$. FIG. 2 shows the power variations obtained in this case in relation to variations in wavelength. As shown in FIG. 2, the power varies less than ±0.1% throughout the entire visible spectrum from 400 nm to 700 nm to indicate that an achromatic effect (achromatism) is adequately attained. FIG. 3 shows the variations of power obtained, in the case of the above-stated example, in relation to temperature variations. As apparent from FIG. 3, the power variations are corrected down to a rate less than 0.005% within a range of temperature variations ±30 degrees to indicate also an adequate performance.

In accordance with the invention, a diffracting optical element which forms the diffracting surface is not required to be in any special shape. Therefore, a Fresnel-type diffraction grating having a known saw-tooth-like grooved shape or a diffraction grating of a binary type having a stepped grooved shape can be employed as the diffracting optical element. In manufacturing the lens system, the diffracting optical element may be formed either directly on the base material of a refracting lens or formed on a refracting surface after a photosensitive polymer or the like is thinly applied to the refracting surface.

Figure 4:
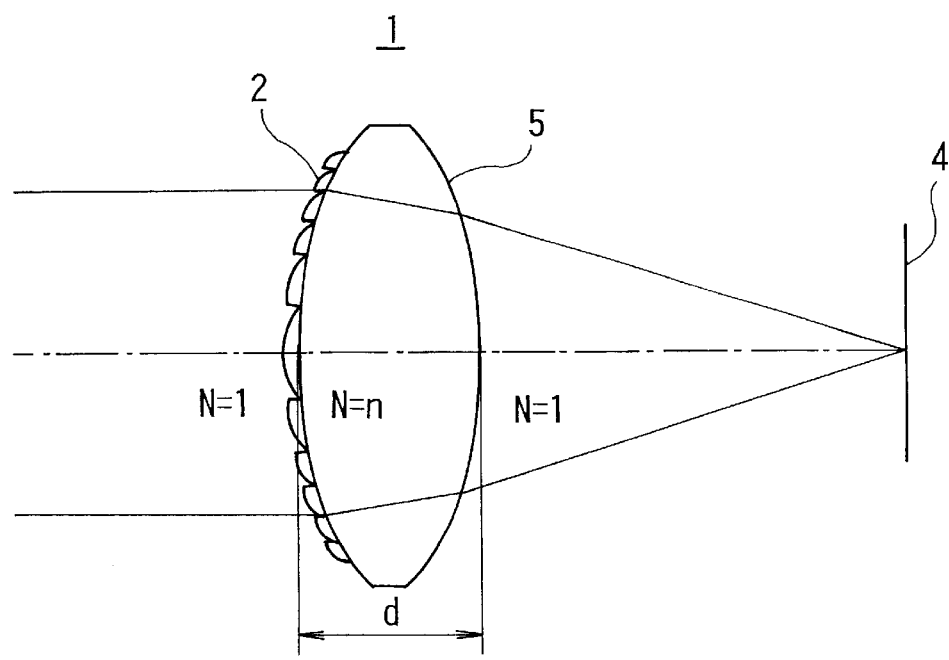
FIG. 4 shows a lens system arranged according to the invention as another embodiment thereof.
Figure 5:
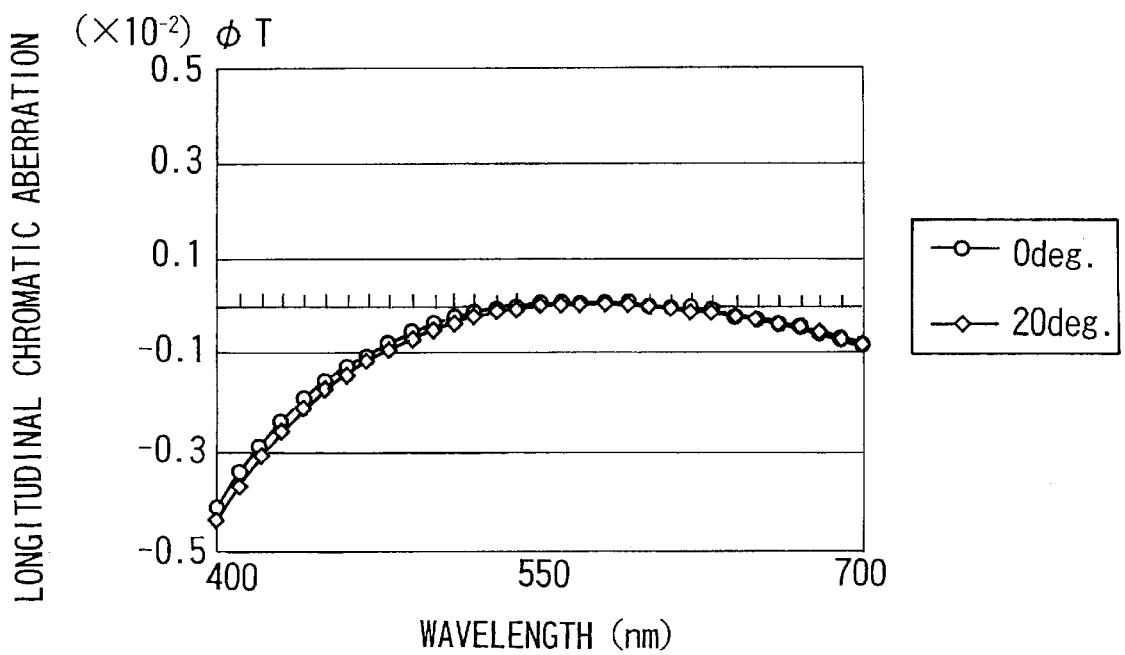
FIG. 5 shows by way of example how the power of the lens system shown in FIG. 4 varies in relation to variations of wavelength.
Figure 6:
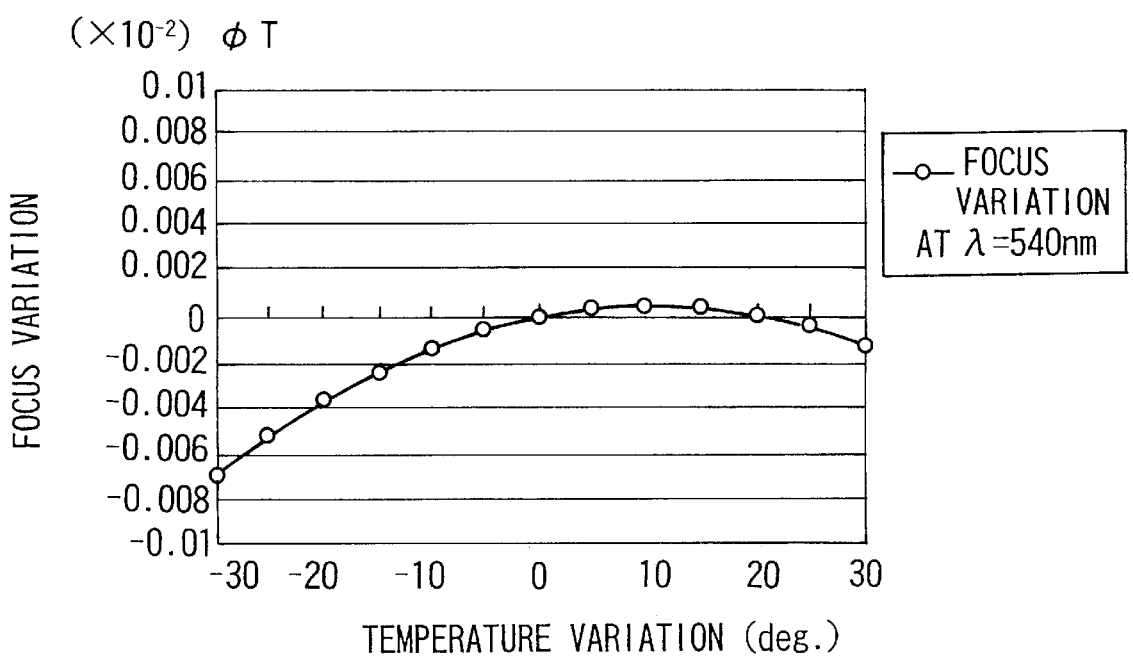
FIG. 6 shows by way of example how the power of the lens system shown in FIG. 4 varies in relation to variations of temperature.

While the embodiment is described above by way of example as arranged to have two diffracting surfaces, the invention can be carried out for a lens system having at least one diffracting surface. In that case, the lens system can be more easily manufactured at a lower cost as its structural arrangement becomes simpler to dispense with a process for optical axis adjustment between the diffracting surfaces. FIG. 4 shows a lens system arranged to have such a simpler structural arrangement as a second embodiment of the invention. In FIG. 4, all elements that are identical to those shown in FIG. 1 are indicated by the same reference numerals. Referring to FIG. 4, a surface 5 has only a refracting surface and has no diffracting surface there. FIG. 5 shows variations in power taking place in the second embodiment in relation to wavelength variations. FIG. 6 shows power variations taking place in the second embodiment in relation to temperature variations. The variables of the elements of the second embodiment are set as follows: $\phi_a=0.0440682$, $\phi_b=0$, $\phi_1=1.4115329$, $\phi_2=1.4928773$ and $d=1.3396948$. As apparent from FIGS. 5 and 6, although the amounts of variations are greater than in the first embodiment shown in FIG. 1, the second embodiment is capable of sufficiently correcting both the chromatic aberration and the power variations due to temperature variations.

The second embodiment shown in FIG. 4 may be modified to remove the diffracting surface from the first surface 1 and to have a diffracting surface formed on the second surface 5.

In the case of each of the embodiments described above, the invention is applied to a single lens. However, the invention is not limited to single lenses but is of course applicable to a lens system in which at least one of diffracting and refracting optical systems is composed of a plurality of lenses. In that case, the lens system can be adequately arranged by first obtaining the amounts of power variations in relation to both wavelength and temperature variations for each of surfaces and, after that, by arranging the overall power of the entire lens system to be constant.

In each of the embodiments described above, the optical characteristics, such as the focal length and the focus position (focal point), of the lens system are arranged to be unvarying by adjusting the lens system only. However, since the lens system is supported by a lens barrel in actuality, the lens system can be arranged to have its overall optical characteristic unvarying by taking into consideration also the expansion and the contraction of the lens barrel anticipated to be caused by variations in temperature.

According to the arrangement of each of the embodiments described above, not only the optical characteristics such as a focal length and a focus position can be arranged to be unvarying against temperature variations but also an achromatic effect can be attained for a desired wavelength region. Further, since a plastic lens is usable without necessitating use of any additional mechanism such as a temperature sensor, the lens system can be manufactured at a low cost. The arrangement for combining the diffracting optical system and the refracting optical system with each other effectively permits enhancement in performance and reduction in number of lenses to be included.

In the case of each of the embodiments described above, the optical characteristics to be compensated for variations are described to be paraxial powers, i.e., the focal length and the focus position (focal point), of the lens system. In accordance with the invention, however, the optical characteristics to be compensated for variations are not limited to these characteristics but may include, for example, also a spherical aberration. In cases where the spherical aberration is to be compensated for its variations, an optical system can be arranged to have its spherical aberration unvarying against wavelength and temperature variations by deriving, from marginal rays of light other than on-axial rays of light, some formulas corresponding to the formulas (2), (4) and (6) disclosed in the foregoing and by obtaining a solution from these formulas. Further, according to the invention, it is also possible to include both the spherical aberration and the paraxial powers (the focal length and the focus position) in the optical characteristics to be compensated.

The lens system in each of the embodiments described above has only the refracting optical system besides the diffracting optical system. However, the invention applies also to a lens system having a reflecting optical system such as a plane mirror, a concave mirror or the like in addition to the above-stated optical systems.

While a plastic lens is used in each of the embodiments described above, the invention is applicable to a lens system composed of a mixture of a plastic lens and a glass lens and also to a lens system composed of a glass lens of a large coefficient of thermal expansion.

Since the lens system in each of the embodiments described above can be manufactured at a low cost and yet has a high performance, the lens system is highly suited for the image forming optical system of optical apparatuses such as an interchangeable lens, a camera, a copying apparatus, a projector, etc. Further, a lens system designed on the basis of the spirit and principle of the invention is applicable to the image forming optical system of optical apparatuses other than the optical apparatuses mentioned above, such as a microscope, a binocular, a telescope, a semiconductor-device manufacturing exposure device, an optical recording/reproducing apparatus, etc.

According to the arrangement of each of the embodiments described above, a lens system which is capable of keeping its optical characteristics substantially unvarying against temperature variations within a predetermined range of variations and also attaining an achromatic effect within a predetermined region of wavelengths can be arranged to have a high rate of performance. In accordance with the invention, therefore, a lens system and an optical apparatus using the lens system can be arranged to excel in performance.

What is claimed is:

1. A lens system comprising:
   a lens having one or two diffracting surfaces and two refracting surfaces, in which each power of the diffracting and refracting surfaces and a distance between the two refracting surfaces are set to satisfy the following equations:

$$\phi_T'-\phi_T=0$$
   $$\phi_T''-\phi_T=0$$

wherein
   $\phi_T$ represents the power of said lens at a predetermined wavelength and a predetermined temperature,
   $\phi_T'$ represents the power of said lens at a different wavelength from the predetermined wavelength and the predetermined temperature, and $\phi_T"$ represents the power of said lens at the predetermined wavelength and a different temperature from the predetermined temperature, $\phi_T$, $\phi_T'$, and $\phi_T"$ are respectively represented by the following equations, $$\phi_T = (\phi_a + \phi_1) + (\phi_b + \phi_2) - d(\phi_a \phi_b + \phi_1 \phi_2 + \phi_a \phi_2 + \phi_b \phi_1)/n$$

$$\phi_T' = (\phi_a' + \phi_1') + (\phi_b' + \phi_2') - d(\phi_a' \phi_b' + \phi_1' \phi_2' + \phi_a' \phi_2' + \phi_b' \phi_1')/n_1$$

$$\phi_T" = (\phi_a" + \phi_1") + (\phi_b" + \phi_2") - d"(\phi_a" \phi_b" + \phi_1" \phi_2" + \phi_a" \phi_2" + \phi_b" \phi_1")/n_2$$

$\phi_a$, $\phi_b$, $\phi_1$, $\phi_2$, d, and n respectively represent the power of one of the diffracting surfaces, the power of the other of the diffracting surfaces, the power of one of the refracting surfaces, the power of the other of the refracting surfaces, the distance between the two refracting surfaces, and the refractive index of said lens, at the predetermined wavelength and the predetermined temperature, $\phi_a'$, $\phi_b'$, $\phi_1'$, $\phi_2'$, and $n_1$ respectively represent the power of one of the diffracting surfaces, the power of the other of the diffracting surfaces, the power of one of the refracting surfaces, the power of the other of the refracting surfaces, and the refractive index of said lens, at the different wavelength and the predetermined temperature, $\phi_a"$, $\phi_b"$, $\phi_1"$, $\phi_2"$, d", and $n_2$ respectively represent the power of one of the diffracting surfaces, the power of the other of the diffracting surfaces, the power of one of the refracting surfaces, the power of the other of the refracting surfaces, the distance between the two refracting surfaces, and the refractive index of said lens, at the predetermined wavelength and the different temperature, and wherein power variation of said lens is less than 0.1% throughout a range of wavelength from 400 nm to 700 nm and is less than 0.005% within a range of temperature variations of ±30° C.

2. A lens system according to claim 1, wherein a diffracting surface of the one or two diffracting surfaces has a diffraction grating which is in a saw-tooth-like sectional shape.

3. A lens system according to claim 1, wherein a diffracting surface of the one or two diffracting surfaces has a diffraction grating which is in a stepped sectional shape.

4. A lens system according to claim 1, wherein a diffracting surface of the one or two diffracting surfaces and a refracting surface of the two refracting surfaces are formed as a common surface.

5. A lens system according to claim 4, wherein said lens is a single lens having both said diffracting surface and said refracting surface formed on one surface thereof, and only a refracting surface of the two refracting surfaces formed on the other surface thereof.

6. A lens system according to claim 4, wherein said lens is a single lens having both said diffracting surface and said refracting surface formed on one surface thereof, and both a diffracting surface of the one or two diffracting surfaces and a refracting surface of the two refracting surfaces formed on the other surface thereof.

7. A lens system according to claim 1, wherein said lens is a plastic lens.

8. An optical apparatus comprising a lens system according to claim 1, and means for holding a photosensitive body, wherein an image of an object is formed by said lens system on said photosensitive body.

9. An optical apparatus according to claim 8, wherein said optical apparatus is a camera.

10. An optical apparatus according to claim 8, wherein said optical apparatus is a copying apparatus.

11. An optical apparatus according to claim 8, wherein said optical apparatus is a semiconductor-device-manufacturing exposure device.

12. An optical apparatus comprising a lens system according to claim 1, wherein an image of an object to be observed is projected by said lens system.

13. An optical apparatus according to claim 12, wherein said optical apparatus is a microscope.

14. An optical apparatus according to claim 12, wherein said optical apparatus is a projector.

15. An optical apparatus according to claim 12, wherein said optical apparatus is one of a binocular and a telescope.

16. An optical apparatus according to claim 12, wherein said optical apparatus is an optical recording/reproducing apparatus.

17. A lens system comprising at least one diffracting surface and a plurality of refracting surfaces, wherein said at least one diffracting surface and said plurality of refracting surfaces are configured so that:

(a) power of said lens system varies less than ±0.1% throughout a range of wavelength from 400 nm to 700 nm; and (b) power of said lens system varies less than 0.005% within a range of temperature variations of ±30° C.

18. A lens system according to claim 17, wherein said lens system includes a first lens including a diffracting surface of said at least one diffracting surface and a second lens including a refracting surface of said plurality of refracting surfaces.

19. A lens system according to claim 18, wherein said first lens includes, in addition to said diffracting surface, a refracting surface of said plurality of refracting surfaces.

20. A lens system according to claim 19, wherein said second lens includes, in addition to said refracting surface, a diffracting surface of said at least one diffracting surface.

21. A lens system according to claim 20, wherein at least one of said first lens and said second lens is a lens having said diffracting surface and said refracting surface formed as a common surface.

22. A lens system according to claim 17, wherein said lens system consists of a single lens.

23. A lens system according to claim 22, wherein said lens is a plastic-containing lens.

24. A lens system according to claim 22, wherein said lens is a plastic lens.

25. A lens system according to claim 24, wherein said plastic lens is made of PMMA.

26. A lens system according to claim 22, wherein said lens has two said diffracting surfaces.

27. A lens system according to claim 22, wherein said lens has only one diffracting surface.

* * * * *